Patented Dec. 8, 1942

2,304,099

UNITED STATES PATENT OFFICE 2,304,099

PROCESS FOR ISOLATING VEGETABLE PROTEINS

Percy L. Julian, Maywood, and Bernard T. Maiter, Chicago, Ill., assignors to The Glidden Company, Cleveland, Ohio, a corporation of Ohio No Drawing. Application April 8, 1939,
Serial No. 266,859

8 Claims. (Cl. 260—112)

The present invention relates to the preparation of isolated vegetable protein such as soy bean protein.

Cone and Brown in United States Patent No. 1,955,375 described a process in which the extracted protein is subjected to a digestion with lime. According to this patent lime is added to the extract, which may be either a caustic alkali; water, or an alkaline salt extract, and the limed extract is digested. Lime itself may also be used for the extraction. When caustic alkali is used for the extraction and lime added, there results a digestion in the presence of both lime and caustic alkali with resulting hydrolysis of the protein. The use of caustic alkali for extraction, however, is attendant with certain inherent difficulties. The alkali makes the slurry of the protein material difficult to separate. It is not easily filtered due to clogging of the filter. If a screen is used a large amount of partially peptized but insoluble material is retained in the liquor. Centrifuging breaks up the solids in the alkaline slurry and a clear separation is impossible in commercial practice. The only effective way to obtain a satisfactory separation is by settling and decanting, but in such a case a large amount of liquor is retained in the bulky solids. Washing and re-extraction may recover some of this loss, but this is expensive, time consuming, and the product finally recovered from the re-extract is generally not of first quality. Due to different hydrolysis conditions it is generally not feasible to combine the liquors.

The Cone and Brown patent mentions a water extraction but in such a case only lime is used in the digestion. It has been found preferable, however, to digest with both caustic alkali and lime in order to effect the proper hydrolysis of the protein.

It is accordingly an object of the present invention to provide an improved process for isolating vegetable proteins.

A further object is to provide an improved process of isolating protein employing a digestion with lime.

A further object is to provide an improved process of preparing an isolated derived vegetable protein employing a digestion with caustic alkali and lime.

Other objects will be apparent as the description of the invention proceeds.

According to the invention a proteinaceous seed material, preferably soy bean meal in the form of oil free flakes is first extracted with water. The slurry thus formed is readily separated by suitable means, the liquor containing the protein, including albumins, sugars, gums, and other water soluble ingredients. The solids consist mainly of fibre and insoluble proteins. Upon the addition of both caustic alkali and lime to the water extract a flocculant precipitate is formed which is readily removed by centrifuging. This centrifuging of the alkaline liquor is not harmful at this stage of the process since the bulk of the insolubles have been removed, and a clean separation may be made. This centrifugal separation may be made at any time during the hydrolysis or digestion with caustic alkali and lime or after the hydrolysis is complete, but preferably is done before the end of the predetermined hydrolysis. A minimum of 90% recovery on the centrifuge is obtained, a much higher recovery than heretofore attainable commercially in the case where a preliminary separation of the liquor from the solids is not made. Also a real clarification of the liquor is obtained which is not possible if the clarification relied upon is made prior to the addition of alkali and lime.

After completion of the hydrolysis the protein is precipitated by addition of acid to the liquor to a pH corresponding to the iso-electric point (pH 4.6–4.8) after which the curd is separated from the bulk of the water, dried and ground.

The hydrolysis with caustic alkali and lime is preferably carried out at elevated temperatures and the degree of hydrolysis will vary with the temperature, time and amount of alkali and lime. Thus, if the amount of caustic alkali and lime is held constant, a higher temperature will result in a shorter hydrolysis time to produce the same degree of hydrolysis, or decreasing the amount of alkali and lime will require a longer hydrolysis if the temperature is the same.

It has been found, however, that the temperature-time-caustic alkali and lime factor for hydrolysis is decreased in the case of a water extraction over other extraction methods. A comparison was made between a simple alkali extraction, an alkaline extraction preceded by an acid leach at pH 4.6 at room temperature (20° C.), an alkaline extraction preceded by an acid treatment at pH 4.6 at a temperature of 170° F., and the present water extraction. The amounts of caustic alkali and lime in each case were substantially the same after allowing for neutralization in the case of the pre-acid treatment. Table I shows the results.

Table I

| Treatment | T° of hydrolysis | Time of hydrolysis | Pipette viscosity H¹O=26.6 |
|---|---|---|---|
|  |  | Hours | Seconds |
| No leach | (¹) | 24 | 86.0 |
| Do | (¹) | 24 | 52.4 |
| Cold leach | (¹) | 24 | (²) |
| Do | (¹) | 24 | 56.6 |
| Hot leach | 110° F. | 9 | 36.5 |
| Do | 110° F. | 6 | 42.0 |
| Water extraction | 110° F. | 6 | 36.8 |
| Do | 110° F. | 6 | 34.1 |
| Do | 110° F. | 6 | 35.6 |

¹ Room T.° (about 80° F.).
² Over 3 mins.

This table not only shows that the time of hydrolysis on a water extraction is materially less than in the case of the other types, but also that in the cases of no leaching and cold acid leach, a greater degree hydrolysis as indicated by the viscosity, and a more uniform and predictable results, since the viscosities in the case of water extraction are more uniform. This uniformity or predictability of results is important since it enables the conditions for a desired degree of hydrolysis to be predetermined.

In accordance with the invention the following illustrative procedure was carried out. 4160# of oil free soy bean flakes were slurred in 7480 gallons of water and agitated for 1 hour, the pH being 6.6 to 6.8. After separation of the extract from the insolubles, caustic soda and lime were added to the extract at 110° F. in amounts of 2.5% of each by weight of the protein content of the liquor. Upon the addition of both the caustic alkali and the lime a flocculent precipitate formed. After one hour the centrifuging was started and this was completed within three hours. The time determined for hydrolysis was six hours which in this case was the total elapsed time from the addition of caustic and lime to the precipitation step. The temperature was maintained at approximately 110° F. throughout, and after six hours sulfuric acid was added to a pH of 4.6 to 4.8 to precipitate the protein as a curd. The curd was thickened in a thickener, washed by reslurrying with water at pH 4.6 and rethickened, filtered, dried and ground. If washing is not resorted to the initially thickened curd is filtered, dried and ground.

An important feature of the invention lies in the fact that the time necessary for the hydrolysis with caustic alkali and lime is considerably reduced. When lime alone is used there is not a significant amount of hydrolysis or at least it has been found that improved results are obtained when the digestion is carried out with both caustic alkali and lime. By the present process the time-temperature-caustic alkali and lime factor to give a desired and predetermined degree of hydrolysis is shortened, the most important fact of which is the saving in time possible. This saving in time is important as it represents a considerable economic saving. The desired degree of hydrolysis may be determined by predetermining the conditions for effecting the desired hydrolysis and conducting the hydrolysis under these conditions; or the degree of hydrolysis desired may be determined by testing for the amount of hydrolysis as hydrolysis proceeds by suitable means, and the hydrolysis stopped when the desired degree of hydrolysis is reached.

Another advantage of the process is the ease and efficiency by which a highly clarified liquor is obtained which results in a protein substantially free of material indispersible in the usual alkaline cutting agents. In the first place the water slurry is readily separated since there is no alkali present to cause peptization of certain constituents of the original material resulting in clogging of filters, screens, or other mechanical means of separation. Accordingly a simple separation is possible. Also it has not been heretofore realized that caustic alkali caused the precipitation of an insoluble flocculent precipitate which resulted in a dispersion residue in the final product. Of course clarification of an alkaline extract automatically removed this precipitate when good clarification was obtained, but as previously pointed out this is a difficult operation. For this reason previous attempts to use a water extraction were not satisfactory since a residue remained which was insoluble in the usual alkaline cutting agents. However, by waiting until after the addition of both caustic alkali and lime, to the previously separated water slurry to effect the final clarification or polishing, many of the difficulties encountered previously in water extraction are readily and simply overcome.

A yield of isolated protein of about 24 to 26% by weight of the flakes from flakes having a protein content of 45% by weight is possible by employing the process of the present invention.

It is to be understood that other modes of applying the principle of the invention may be employed and that variations and modifications may be made therein without departing from the spirit of the invention.

Having described the invention what is claimed and desired to secure by Letters Patent of the United States is:

1. In a process for preparing isolated vegetable protein the steps comprising extracting a proteinaceous seed material with water, separating the water extract from the insolubles, thereafter adding caustic alkali and lime to the extract and digesting the thus formed alkaline liquor.

2. In a process for preparing isolated vegetable protein the steps comprising extracting soy bean meal with water, separating the water extract from the insolubles, thereafter adding caustic alkali and lime to the extract and digesting the thus formed alkaline liquor.

3. In a process for preparing isolated vegetable protein the steps comprising extracting soy bean meal with water, separating liquid from insolubles to form a water extract, adding caustic alkali and lime to the water extract thereby forming an alkaline liquor, centrifuging the alkaline liquor, and digesting the alkaline liquor resulting from the addition of the caustic alkali and lime.

4. In a process for preparing isolated vegetable protein the steps comprising extracting soy bean meal with water, separting the liquid from the insolubles to form a water extract, adding caustic alkali and lime to said extract and digesting to effect hydrolysis of the protein, centrifuging during the hydrolysis, and precipitating the protein from the clarified liquor upon completion of the desired degree of hydrolysis.

5. In a process for preparing isolated vegetable protein the steps comprising extracting soy bean meal with water, separating liquid from insolubles to form an aqueous extract, adding caustic alkali and lime to the extract and digesting to effect the desired degree of hydrolysis, thereafter centrifuging to effect clarification, and precipitating the protein from the thus clarified liquor.

6. In a process for preparing isolated vegetable proteins the steps comprising extracting soy bean meal with water, separating the water extract from insolubles, adding caustic alkali and lime to the extract thereby forming an alkaline liquor, centrifuging the alkaline liquor, digesting the alkaline liquor until the desired degree of hydrolysis of the protein is obtained, and thereafter precipitating the protein from the alkaline liquor.

7. In a process for preparing isolated vegetable proteins the steps comprising extracting soy bean meal with water, separating water extract from insolubles, adding caustic alkali and lime to the water extract whereby caustic alkali and lime insoluble fractions precipitate, and thereafter separating the material insoluble in the aqueous caustic alkali and lime solution but which were soluble in the water extract from the solution, and recovering the protein from the thus purified solution.

8. In a process for preparing isolated vegetable protein the steps comprising extracting soy bean meal with water, separating the water extract from the insoluble residue remaining, adding caustic alkali to the separated water extract, thereafter centrifuging the extract to remove the flocculent precipitate formed upon the addition of the caustic alkali and recovering the protein from the thus clarified extract.

PERCY L. JULIAN.
BERNARD T. MALTER.